June 19, 1951  W. J. KIVELL  2,557,354
VEHICLE STABILIZING APPARATUS
Filed May 6, 1948  4 Sheets-Sheet 1
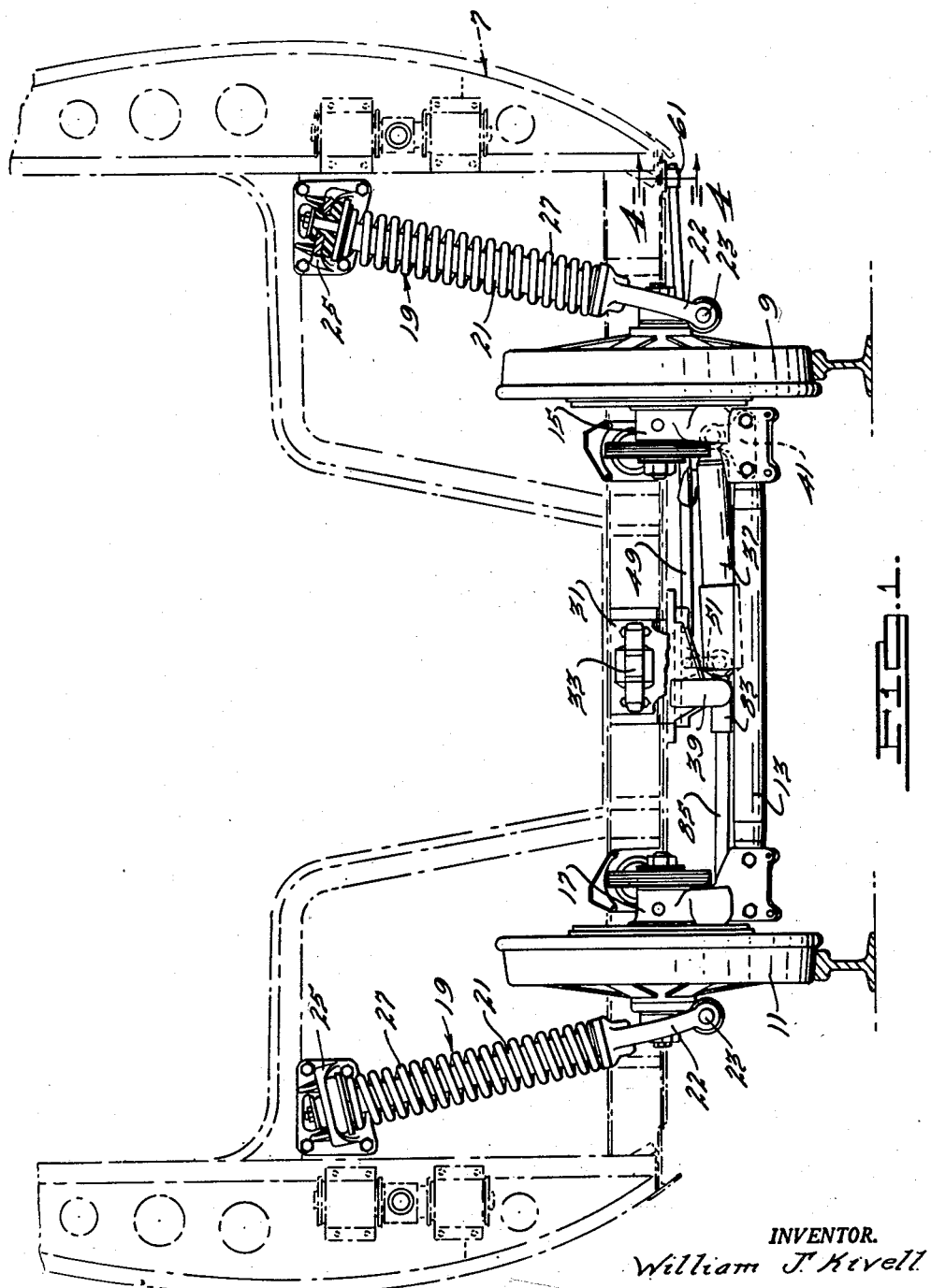
INVENTOR.
William J. Kivell
BY
Harness, Dickey & Pierce
ATTORNEYS

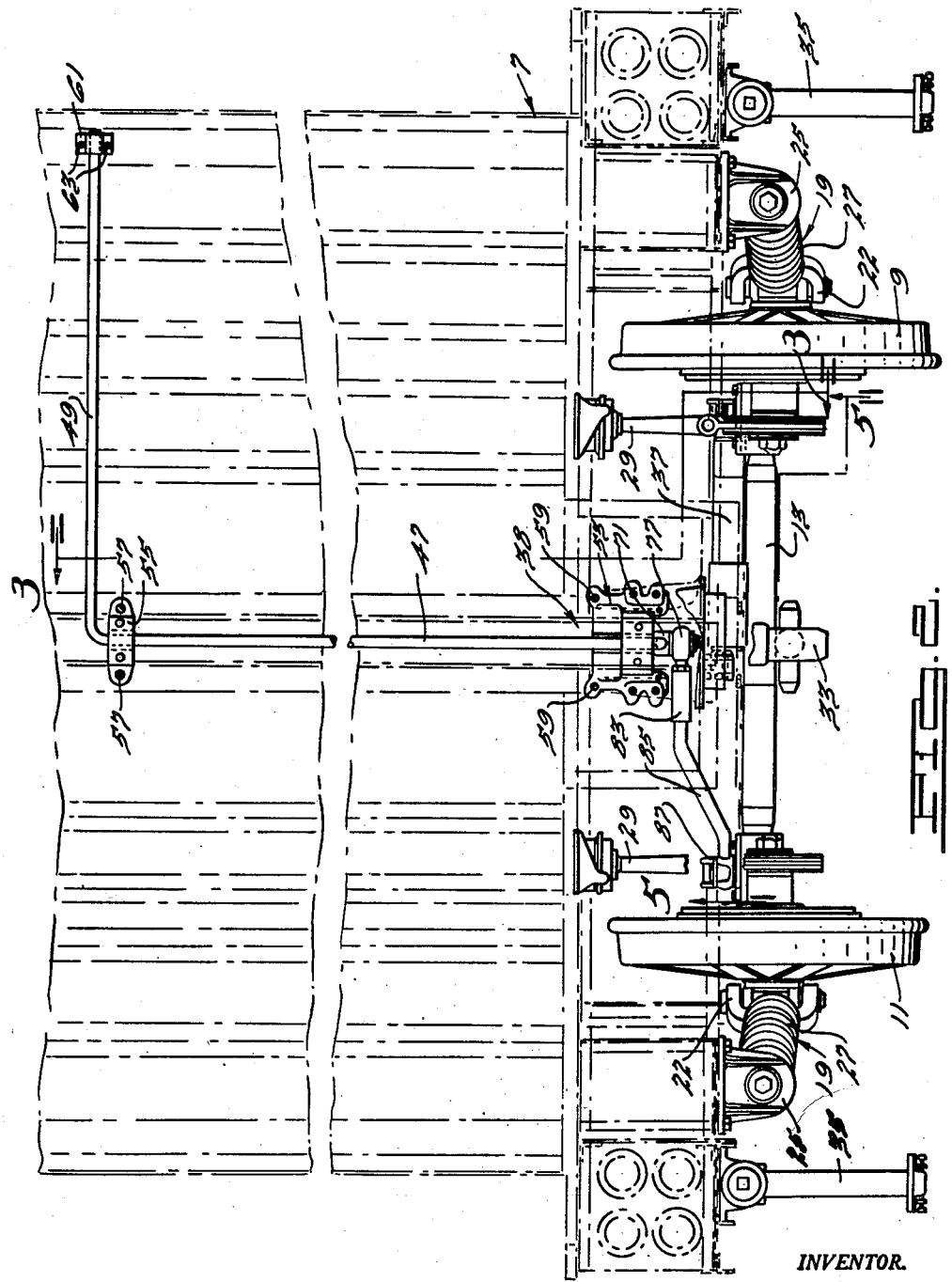

June 19, 1951 — W. J. KIVELL — 2,557,354
VEHICLE STABILIZING APPARATUS
Filed May 6, 1948 — 4 Sheets-Sheet 3
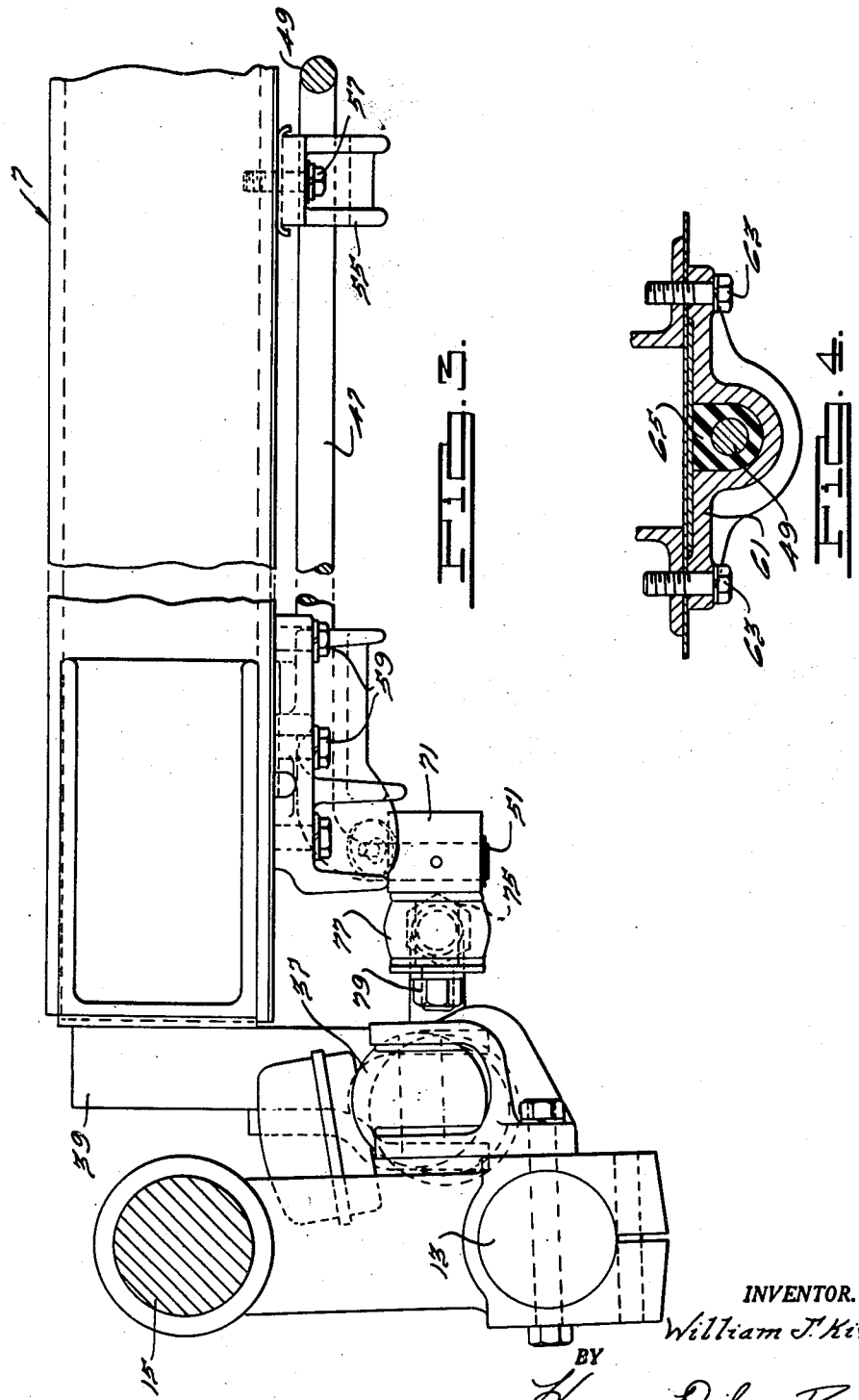
INVENTOR.
William J. Kivell
BY
Harness, Dickey & Pierce.
ATTORNEYS.

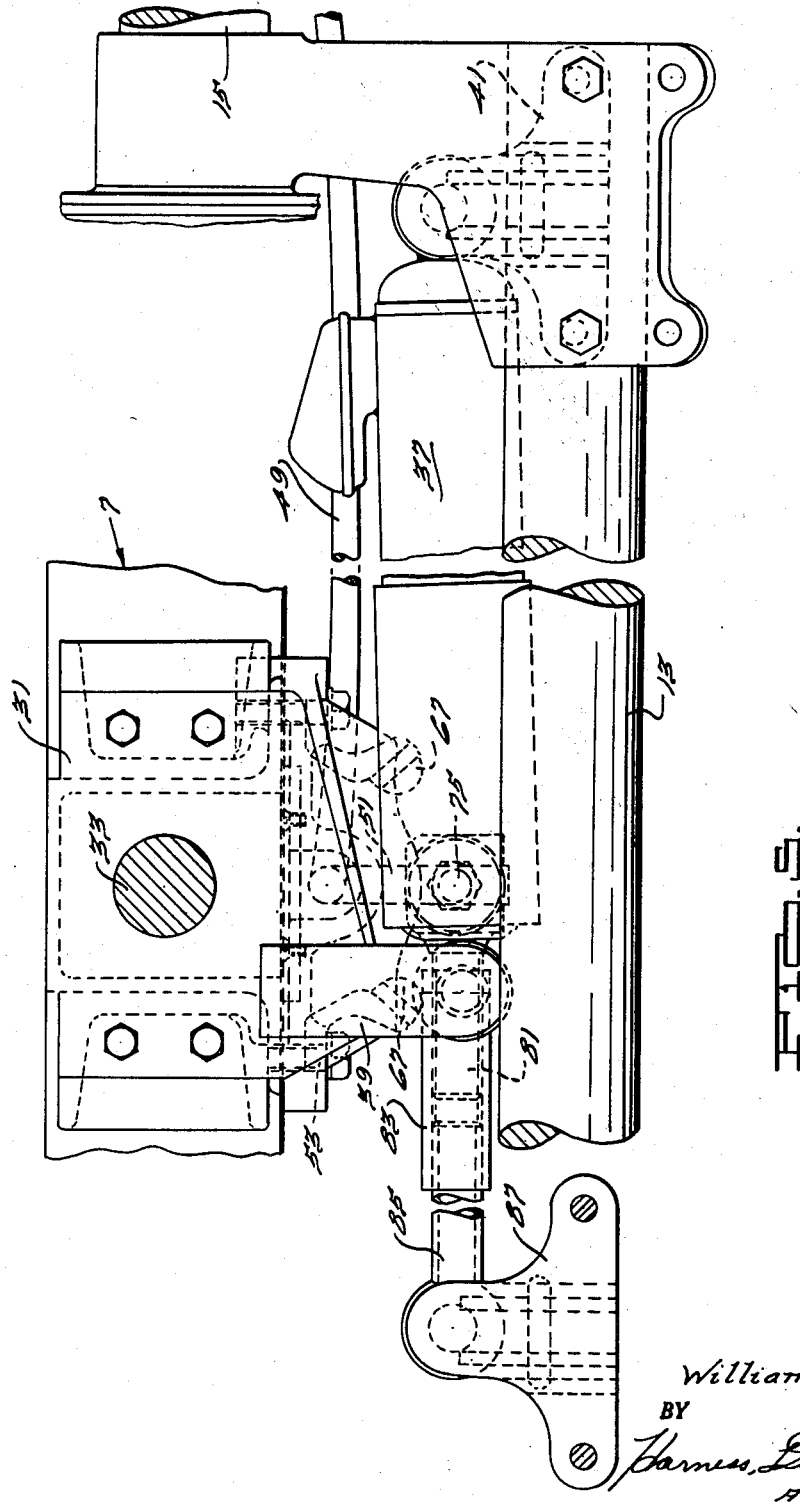

Patented June 19, 1951

2,557,354

UNITED STATES PATENT OFFICE 2,557,354

VEHICLE STABILIZING APPARATUS

William J. Kivell, Monroe, Mich., assignor to Monroe Auto Equipment Company, Monroe, Mich., a corporation of Michigan Application May 6, 1948, Serial No. 25,483

10 Claims. (Cl. 267—67)

This invention relates to vehicle stabilizing apparatus, and more particularly to apparatus for resiliently maintaining a vehicle body in a centered relationship with respect to the wheels and axle.

The stabilizing apparatus of this invention is illustrated in the drawings in conjunction with a railroad passenger car of the type having the body resiliently supported on a wheel axle so as to be free to move both vertically and laterally with respect to the wheels and axle. The apparatus of this invention is adapted to be connected between the railroad car body and the axle so as to both dampen the amplitude of lateral swinging of the body and resiliently maintain the body in a centered relationship with respect to the axle. It will be appreciated, however, that the apparatus of this invention may be employed with various types of vehicles and is not limited to use with the particular railroad car construction herein illustrated and described.

It is an object of this invention to provide, in stabilizing apparatus of the aforementioned type, a shock absorber for dampening the amplitude of lateral movement between a vehicle body and wheel axle.

It is a further object of this invention to provide, in stabilizing apparatus of the aforementioned type, an improved torsion bar construction adapted to be connected between the vehicle body and wheel axle so as to resiliently maintain the body in a centered relationship with respect to the axle.

It is a still further object of this invention to provide, in stabilizing apparatus of the aforementioned type, improved bracket means so constructed and arranged as to both support and prevent overstressing of the aforementioned torsion bar.

It is a still further object of this invention to provide, in stabilizing apparatus of the aforementioned type, a novel arrangement for connecting the aforementioned torsion bar to a vehicle axle and vehicle body so that the torsion bar will be actuated upon relative movement between the vehicle body and axle and will thereby maintain the body and axle in the aforementioned centered relationship.

It is a still further object of this invention to provide improved stabilizing apparatus of the aforementioned type which may be used with various types of vehicles and which is relatively simple in construction, economical to manufacture and exceptionally efficient in operation.

These and other objects of this invention will become apparent from the following detailed description taken in conjunction with the accompanying drawings in which:

Figure 1 is a fragmentary end elevational view of a railroad car with the stabilizing apparatus of this invention connected thereto, with parts being broken away in section for purposes of clarity;

Fig. 2 is a fragmentary plan view of the underside of the railroad car illustrated in Fig. 1, with the stabilizing apparatus of this invention connected thereto;

Fig. 3 is an enlarged sectional view of the structure illustrated in Fig. 2, taken along the line 3—3 thereof;

Fig. 4 is a sectional view of the structure illustrated in Fig. 1, taken along the line 4—4 thereof; and Fig. 5 is an enlarged sectional view of the structure illustrated in Fig. 2, taken along the line 5—5 thereof.

Referring now to the drawings, and more particularly to Figs. 1 and 2, it will be seen that the railroad car illustrated herein includes a body 7, track-engaging wheels 9 and 11, a wheel axle 13 and stub axles 15 and 17 on which the wheels 9 and 11 are journaled. The body 7 is resiliently supported on the wheels and axle by means of suspension devices 19 connected between each of the stub axles 15 and 17 and the adjacent sides of the body 7. Each of the suspension devices 19 includes a direct-acting shock absorber 21, having a bifurcated lower attaching end 22 which is universally connected at 23 to its respective stub axle. The upper end of each of the shock absorbers 21 is connected to a bracket 25 which in turn is connected to the body 7. A coil spring 27 surrounds each of the shock absorbers 21 and has its lower end engaging the bifurcated lower attaching end 22 of the shock absorber 21 and its upper end engaging the body bracket 25, so that the springs and shock absorbers will combine to cushion and dampen relative vertical movement between the body 7 and wheels and thereby provide a smooth riding railroad car. It will, however, be appreciated that the vertical suspension devices 19 do not prevent the body 7 from shifting or swinging laterally with respect to the wheels and axle.

As can best be seen in Fig. 2, radius rods 29 are connected between the body 7 and the stub axles 15 and 17 so as to maintain the wheels and axles in their proper relationship with respect to the body 7 in a vertical plane only, so as to permit relative vertical and lateral movement between the body and the wheels. The railroad body herein illustrated carries a coupler bracket 31 at the rear end thereof which in turn carries a coupler 33 for connecting the body 7 to the body of an adjacent railroad car, so that a plurality of cars may be connected together and pulled by a locomotive. The body 7 is likewise provided, adjacent each side thereof, with coupling devices 35 for connecting the bodies of adjacent railroad cars together so as to prevent relative vertical movement between the adjacent railroad car bodies while at the same time permitting relative lateral movement between the adjacent cars. With this sort of a coupling arrangement, each of the railroad cars shown is provided with a single set of wheels and an axle adjacent the rear end thereof, and the necessity of two sets of wheels for each car is eliminated.

The stabilizing apparatus of this invention includes a direct-acting hydraulic shock absorber 37 and a body centering device 38. The shock absorber 37 is connected between the body 7 and the wheel axle 13 for reducing the amplitudes of lateral movement between the axle and the body. One end of the shock absorber 37 is connected to the coupler bracket 31, at 39, and the other end of the shock absorber is connected to the wheel axle 13 by means of a bracket 41. Thus the shock absorber 37 is disposed in a generally horizontal plane and is constructed so that, upon relative lateral movement between the body 7 and wheel axle 13, the amplitudes of such movement will be controlled and reduced by the action thereof. Any suitable type of shock absorber may be employed, such as the type disclosed in Patent No. 2,357,920, issued September 12, 1944 to R. H. Whisler, Jr., and assigned to the assignee of this invention.

The centering device 38, which resiliently maintains the body 7 in a centered relationship with respect to the wheel axle 13, includes a torsion bar 47, and end arm 49, extending outwardly at substantially right angles to the torsion bar 47 at one end of the latter, and an end arm 51 extending downwardly from the opposite end of the torsion bar. The torsion bar 47 extends longitudinally along the underside of the body 7, adjacent the rear end thereof and substantially midway between the sides thereof, and is connected to the underside of the body by means of a bracket 53, disposed adjacent the downwardly extending arm 51, and a bracket 55, disposed adjacent the outwardly extending arm 49. The bracket 55 is connected to the underside of the body 7 by any suitable means, such as bolts or cap screws 57, so as to rotatably support the forward end of the torsion bar 47. The bracket 53 is likewise rigidly connected to the underside of the railroad body 7 by means of suitable bolts or cap screws 59, so as to rotatably support the adjacent end of the torsion bar 47.

The outwardly extending torsion bar arm 49 has its outer end connected to the underside of the railroad body 7, adjacent one side thereof, by means of a bracket 61. The bracket 61 is connected to the underside of the body 7 by means of suitable bolts or cap screws 63, as can be seen in Fig. 4, and the free end of the arm 49 is supported in the bracket 61 through a suitable rubber bushing 65. The arm 49, intermediate the torsion bar 47 and the bracket 61, is downwardly bent or offset so that the intermediate portion thereof will normally be out of engagement with the underside of the body 7. Thus, when the torsion bar 47 is placed in torsion, the forward end thereof, that is the end adjacent the outwardly extending arm 49, is anchored by means of arm 49, and the arm 49 is placed in bending. Therefore, by bending or offsetting the intermediate portion of the arm 49, the arm can bend its required amount without interference from the underside of the body 7. It will thus be appreciated that the arm 49 anchors the adjacent end of the torsion bar 47 and is placed in bending when so operating.

The downwardly extending torsion bar arm 51 extends below the bottom of the body 7, forward of the coupler bracket 31 and adjacent to the torsion bar mounting bracket 53. The mounting bracket 53 is provided, as can best be seen in Fig. 5, with a pair of opposed bumpers or stop elements 67, which are spaced on opposite sides of the downwardly extending torsion bar arm 51 and are adapted to be engaged thereby. The bumpers or stops 67 will therefore limit lateral swinging movement of the downwardly extending arm 51 and will engage the arm 51 if it swings too far either to the right or left of its centered position. Thus the bumpers 67 prevent overstressing of the torsion bar 47 and act as safety stops to regulate the maximum torsion which may be applied thereto.

A connector element in the form of an apertured block 71 is rigidly connected to the lower end of the downwardly extending torsion bar arm 51 by any suitable means. The block 71 is provided with a rearwardly extending, substantially horizontal pin or trunnion 75. A connector element 77 is pivotally mounted on the trunnion 75 and held thereon against axial movement by means of a nut 79. The connector element 77 is provided with a laterally extending threaded shank 81, which is threadably connected in one end of a sleeve 83. The opposite end of the sleeve 83 is threadably connected to the inner end of a laterally extending link 85. The outer or opposite end of the link 85 is pivotally connected to the wheel axle 13 by means of a suitable bracket 87. The sleeve 83 provides an adjustable connection between the connector element 77 and the connecting link 85 so that manufacturing tolerances can be easily compensated for.

It will thus be seen that in operation, when relative lateral movement occurs between the body 7 and the wheel axle 13, the connecting link 85 will actuate the lower end of the torsion bar arm 51, through the connector elements 77 and 71, so as to swing the torsion bar arm 51 laterally and place the torsion bar 47 in torsion and the torsion bar arm 49 in bending. Thus, when the body 7 moves laterally out of its centered position with respect to the wheels and axle, the torsion bar 47 will be wound and the unwinding of the torsion bar will return the body to its centered relationship with respect to the wheels and axle. Thus the centering device 38 will resiliently maintain the centered relationship between the body and the wheels and axle. At the same time the shock absorber 37 will reduce the amplitude of the lateral movement of the body; that is, it will reduce the amplitudes of movement of the body both toward and away from its centered position. Thus, between the torsion bar and the shock absorber, lateral movement and riding comfort of the railroad car are materially enhanced. With the stabilizing apparatus of this invention, the body may swing laterally with respect to the wheels and axle but it will always be returned to its centered relationship so as to provide the optimum in riding comfort. It will also be appreciated that the novel torsion bar mounting bracket construction, which rotatably supports the torsion bar adjacent the downwardly extending arm, limits the amount of torsion which may be applied to the torsion bar and thus operates in a dual capacity of supporting the torsion bar and preventing overstressing thereof.

While the stabilizing or centering apparatus has been illustrated in conjunction with a rather unique type of railroad car, it will be appreciated that the principles and construction of this invention could be applied to various types of vehicles, in order to maintain the vehicle body in any desired predetermined relationship with respect to the wheels and axle, and thereby provide the optimum of riding characteristics for all types of vehicles, as far as lateral swinging movement of the same is concerned.

I claim:

1. In combination with a vehicle having a pair of spaced wheels interconnected by axle means and a body supported by said axle means, stabilizing apparatus including a torsion bar extending longitudinally of and connected to said body substantially midway between the sides of the body, an arm extending outwardly from one end of said torsion bar and connected to said body so as to be placed in bending when said torsion bar is torsionally loaded, an arm extending downwardly from the opposite end of said torsion bar adjacent said axle means, link means extending between said downwardly extending arm and said vehicle axle means, means pivotally connecting said link means to said axle means adjacent one of said wheels and to the lower end of said arm so that upon relative lateral movement between said axle means and body said link means will actuate said downwardly extending arm so as to torsionally load said torsion bar and thereby resiliently maintain said body and axle means in a centered relationship with respect to each other.

2. In combination with a vehicle having a pair of spaced wheels interconnected by axle means and a body supported by said axle means, stabilizing apparatus including a torsion bar connected to and extending longitudinally of and below said body substantially midway between the sides of said body, an arm extending outwardly from one end of said torsion bar and connected to said body so as to retain the adjacent end of said torsion bar against rotative movement and so as to be placed in bending when said torsion bar is torsionally loaded, an arm extending downwardly from the opposite end of said torsion bar adjacent said axle means, bracket means rigidly connected to said body and rotatably supporting said torsion bar adjacent said downwardly extending arm, stop means on said bracket means adapted to be engaged by said downwardly extending arm so as to limit lateral swinging movement of said arm, link means extending between said downwardly extending arm and said vehicle axle means, means pivotally connecting said link to said axle means adjacent one of said wheels and to the lower end of said arm so that upon relative lateral movement between the axle means and body the link will actuate the said downwardly extending arm so as to torsionally load said torsion bar and thereby resiliently maintain said body and axle means in a centered relationship with respect to each other.

3. In combination with a vehicle having a pair of spaced wheels interconnected by axle means and a body supported by said axle means, stabilizing apparatus including a torsion bar extending longitudinally of and connected to said body substantially midway between the sides thereof, an arm extending outwardly from one end of said torsion bar and connected to said body so as to retain the adjacent end of said torsion bar against rotation and so as to be placed in bending when said torsion bar is torsionally loaded, an arm extending downwardly from the opposite end of said torsion bar adjacent said axle means, link means extending between said downwardly extending arm and said vehicle axle means, means pivotally connecting said link to said axle means adjacent one of said wheels and to the lower end of said arm so that upon relative lateral movement between the axle means and body said link will actuate said downwardly extending arm so as to torsionally load said torsion bar and thereby resiliently maintain said body and axle means in a centered relationship with respect to each other, and shock absorber means connected to said body and to said axle means so as to dampen the amplitude of relative lateral movement between said body and said axle means.

4. In combination with a vehicle having a pair of spaced wheels interconnected by axle means and a body supported by said axle means, stabilizing apparatus including a torsion bar extending longitudinally of and connected to said body substantially midway between the sides thereof with one end thereof disposed adjacent said axle means, an arm extending downwardly from the end of said torsion bar adjacent said axle means, means anchoring the opposite end of said torsion bar so that upon lateral movement of said arm said torsion bar will be torsionally loaded, link means extending between said downwardly extending arm and said vehicle axle means, means pivotally connecting said link means to said axle means adjacent one of said wheels and to the lower end of said torsion bar arm so that upon relative lateral movement between the axle means and body the link will actuate said downwardly extending arm so as to torsionally load said torsion bar and thereby resiliently maintain said body and axle means in a centered relationship with respect to each other.

5. In combination with a vehicle having a pair of spaced wheels interconnected by axle means and a body supported by said axle means, stabilizing apparatus including a torsion bar extending longitudinally of and connected to said body substantially midway between the sides of said body with one end disposed adjacent said axle means, an arm extending downwardly from the end of said torsion bar adjacent said axle means, means anchoring the opposite end of said torsion bar so that upon lateral movement of said arm said torsion bar will be torsionally loaded, bracket means rigidly connected to said body and rotatably supporting said torsion bar adjacent said downwardly extending arm, stop means on said bracket means adapted to be engaged by said downwardly extending arm whereby to limit lateral swinging movement of said arm, link means extending between said downwardly extending arm and said vehicle axle means, means pivotally connecting said link means to said axle means adjacent one of said wheels and to the lower end of said torsion bar arm so that upon relative lateral movement between the axle means and body said link will actuate said downwardly extending arm so as to torsionally load said torsion bar and thereby resiliently maintain said body and axle means in a centered relationship with respect to each other.

6. In combination, a vehicle including axle means having wheels journaled on the opposite ends thereof, a vehicle body, resilient and shock absorbing means supporting said body on said axle means, lateral stabilizing apparatus for resiliently maintaining said body in a centered relationship with respect to said axle means including a torsion bar extending below and longitudinally of said body substantially midway between the sides thereof, an integral arm extending outwardly from one end of said torsion bar and having the free end thereof connected to said body adjacent one side of the latter so as to retain the adjacent end of said torsion bar against rotative movement and so as to be placed in bending when said torsion bar is torsionally loaded, an integral arm extending downwardly from the opposite end of said torsion bar adjacent said axle means, bracket means rigidly connected to said body and rotatably supporting said torsion bar adjacent said downwardly extending arm, stop means on said bracket adapted to be engaged by said downwardly extending arm whereby to limit lateral swinging movement of said arm and thereby limit the amount of torsional load which may be applied to said torsion bar, a connector element rigidly connected to the lower end of said downwardly extending arm, link means extending between said connector element and said vehicle axle means, means adjustably and pivotally connecting said link to said connector element, means pivotally connecting said link means to said vehicle axle means adjacent one of said wheels so that upon relative lateral movement between said vehicle body and said axle means said link will actuate said downwardly extending arm and torsionally load said torsion bar whereby to resiliently maintain said body and axle means in a centered relationship with respect to each other, and a substantially horizontally extending tubular direct-acting shock absorber connected to said body and to said axle means so as to reduce and dampen the amplitude of relative lateral movement between said body and axle means.

7. Stabilizing apparatus for use on a vehicle having a body supported on a wheel axle, including a torsion bar adapted to extend longitudinally with respect to the body substantially midway between the sides thereof, bracket means for pivotally connecting said bar to the lower portion of the vehicle body, an arm extending downwardly from one end of said torsion bar, means connected to the opposite end of said torsion bar and adapted to be connected to the vehicle body so as to retain that end of said torsion bar against rotative movement and permit the latter to be torsionally loaded by lateral movement of said downwardly extending arm, bracket means rotatably supporting said torsion bar adjacent said downwardly extending arm and adapted to be rigidly connected to the vehicle body, means on said bracket means for limiting the torsional load applied to said torsion bar by movement of said downwardly extending arm, a connector element rigidly connected to said arm, link means extending laterally of said arm and having one end thereof connected to said connector element for pivotal movement about an axis substantially parallel to the axis of said torsion bar, bracket means pivotally supporting the opposite end of said link means for movement about an axis substantially parallel to the axis of said torsion bar and adapted to be connected to the vehicle axle so that when said stabilizing apparatus is connected to a vehicle the body thereof will be resiliently maintained in a centered relation with respect to said axle.

8. Stabilizing apparatus for a vehicle having a body supported on a wheel axle, comprising a torsion bar adapted to extend longitudinally of and be pivotally connected to the vehicle body, an arm extending outwardly from one end of said torsion bar, bracket means sleeved on the free end of said arm and adapted to be rigidly connected to said body, an arm extending downwardly from the opposite end of said torsion bar at a substantially right angle with respect thereto, a connector element rigidly connected to said downwardly extending arm, link means extending laterally at a substantially right angle to said downwardly extending arm and having one end thereof pivotally connected to said connector element, bracket means for connecting the opposite end of said link means to the vehicle wheel axle so that longitudinal movement of said link means will rock said downwardly extending arm and torsionally wind said bar and tend to rock said outwardly extending arm in a plane at substantially right angles to the plane of movement of said downwardly extending arm.

9. Stabilizing apparatus for use on a vehicle having a body supported on a wheel axle, including a torsion bar adapted to be pivotally connected to the lower portion of a vehicle body and extend longitudinally with respect thereto, an arm extending outwardly from one end of said torsion bar, bracket means connected to the free end portion of said arm and connectable to the vehicle body so as to retain the adjacent end of the torsion bar against rotative movement and permit the latter to be torsionally loaded, an arm exending downwardly from the opposite end of said torsion bar, bracket means rotatably supporting said torsion bar adjacent said downwardly extending arm and adapted to be rigidly connected to the vehicle body, stop means on the latter bracket means for limiting lateral swinging movement of said downwardly extending arm, link means having one end thereof pivotally connected to said downwardly extending arm, said link means extending laterally away from said arms so that longitudinal movement thereof will rock said arm, and bracket means connected to the opposite end of said link means and adapted to be connected to the vehicle axle.

10. Stabilizing apparatus for a vehicle having a body supported on a wheel axle comprising a member having a torsion bar portion adapted to extend longitudinally of and be pivotally connected to the vehicle body, an integral end arm portion extending laterally outwardly from one end of said torsion bar portion and adapted to have the free end thereof connected to said body, said end arm being downwardly bent or offset so that the intermediate portion thereof will be disposed below the opposite ends thereof, an arm portion extending downwardly from the opposite end of said torsion bar portion, a connector element rigidly connected to said downwardly extending arm portion, link means having one end thereof pivotally connected to said connector element and having the opposite end thereof adapted to be connected to the vehicle wheel axle so that when said stabilizing apparatus is connected to a vehicle the body thereof will be resiliently maintained in a centered relationship with respect to the axle.

WILLIAM J. KIVELL.

REFERENCES CITED

The following references are of record in the file of this patent:

UNITED STATES PATENTS

| Number | Name | Date |
|---|---|---|
| 203,330 | Elliott | May 7, 1878 |
| 2,159,813 | Maris | May 23, 1939 |
| 2,182,248 | Chayne | Dec. 5, 1939 |
| 2,360,748 | Whisler et al. | Oct. 17, 1944 |

FOREIGN PATENTS

| Number | Country | Date |
|---|---|---|
| 516,521 | France | Dec. 8, 1920 |
| 357,376 | Italy | Mar. 12, 1938 |